United States Patent [19]

Toyooka et al.

[11] 4,254,074
[45] Mar. 3, 1981

[54] CONTINUOUS PRODUCTION OF DECORATED SYNTHETIC RESIN SHEET

[75] Inventors: Yasuo Toyooka; Kunio Ohnishi; Haruo Murase; Tadaomi Ueno, all of Toyama, Japan

[73] Assignee: Mitsubishi Rayon Co., Ltd., Tokyo, Japan

[21] Appl. No.: 22,492

[22] Filed: Mar. 21, 1979

[30] Foreign Application Priority Data

Mar. 24, 1978 [JP] Japan ................. 53-33676

[51] Int. Cl.³ ............................................. B29D 7/14
[52] U.S. Cl. .................... 264/132; 264/135; 264/171; 264/216; 264/236; 264/255; 264/331; 425/224
[58] Field of Search ............... 264/171, 331, 255, 132, 264/166, 338, 134–135, 216, 236; 425/224

[56] References Cited

U.S. PATENT DOCUMENTS

| 2,997,745 | 8/1961 | Kroeker | 264/255 |
| 3,342,668 | 9/1967 | Dario | 264/132 |
| 3,488,246 | 1/1970 | Duggins | 264/75 |
| 3,872,197 | 3/1975 | Kato et al. | 425/224 |
| 3,978,178 | 8/1976 | Oshima et al. | 264/166 |
| 4,041,120 | 8/1977 | Oshima et al. | 264/255 |
| 4,089,918 | 5/1978 | Kato et al. | 264/166 |
| 4,133,861 | 1/1979 | Kato | 425/224 |

Primary Examiner—Jeffery R. Thurlow
Attorney, Agent, or Firm—Kenyon & Kenyon

[57] ABSTRACT

Synthetic resin sheet material having a film, possibly bearing printing on at least one of its surfaces, with the film forming an integral part of the material is made by feeding the film together with a polymerizable syrup into a continuous plastic casting machine, the film being compatible with the syrup so that during passage through the machine with the syrup, the film softens and at least slightly dissolves in the syrup during polymerizing of the syrup and consequent solidifying of all of the components together.

8 Claims, 5 Drawing Figures

CONTINUOUS PRODUCTION OF DECORATED SYNTHETIC RESIN SHEET

BACKGROUND OF THE INVENTION

The continuous production of synthetic resin sheet is disclosed by the following U.S. patents:

Kato et al U.S. Pat. Nos. 3,872,197 and 3,988,098 which disclose the construction and operation of a continuous casting machine, which when fed with a polymerizable syrup, continuously produces a traveling strip of polymerized synthetic resin.

Kato U.S. Pat. No. 3,894,826 which discloses an improvement detail for the above machine.

Kato U.S. Pat. Nos. 3,966,693, 3,999,686 and 4,077,755 which disclose the preparation of the syrup used by the machine.

Kato U.S. Pat. Nos. 3,892,153, 4,009,628 and 4,044,639 which disclose the cutting of the continuously produced traveling strip, into commercial lengths.

The disclosures of the above patents are incorporated by reference into the present disclosure. Other continuous casting means and methods may be applicable.

To summarize the general principles of the continuous casting of synthetic resin material, a polymerizable syrup of suitable viscosity is used as a starting material. One example might be methyl methacrylate provided with the suitable viscosity by being partially polymerized to form a monomer-polymer mixture, the methyl methacrylate possibly including a copolymerizable unsaturated monomer. Other polymerizable syrups can be used.

This syrup is fed into the entrance end of the casting and polymerizable space of a continuous casting machine, this space being formed by upper and lower traveling spans of highly polished metal belts. Heated water is sprayed on the outsides of the belt spans to form a first polymerization zone where the syrup is polymerized to a degree making it substantially solid, this first zone being followed by a second polymerization zone where by radiant heat on the outsides of the spans said solid from the syrup is heated to a higher temperature effecting a substantially complete polymerization, after which the spans travel through a cooling zone with the finished strip of material exiting from there as a continuously traveling strip of synthetic resin material having highly polished surfaces imparted by contact with the polished steel belt spans. This strip is then cut into sheets of desired lengths.

For a more detailed understanding of the casting technique, reference may be made to the Kato et al patents, keeping in mind that in this instance the spans are uniquely horizontal throughout with the upper belt span in the first zone held up against gravity by the hydraulic pressure of the syrup resulting from its being fed into the entrance end of the belt spans traveling at a velocity providing this pressure. Synthetic resin strip is also produced by continuous machines which provide a hydrostatic pressure by the belt spans being inclined to degrees causing gravity to produce the pressure.

Such continuously produced strip can be colored by incorporating colorants into the syrup fed to the machine. However, it has proven desirable to provide the strip with a more artistic appearance, for example, such as can be provided potentially by the printing art. The finally cut sheets of the strip material are per se hard-surfaced, resistant to surface marking and substantially weatherproof, characteristics which, however, are not enjoyed by printing applied to the surface of the sheet material.

In the case of the glass cell casting and polymerizing practice, it has been proposed to place a possibly printed film on the inside of one of the cell glass plates prior to casting the syrup into the cell. An example is provided by British Pat. No. 1,274,516. Such practice has resulted in formation of wrinkles in the film. In any event, the glass cell method is necessarily a batch-type operation involving a low production rate and high labor cost.

SUMMARY OF THE INVENTION

The present invention permits the use of the continuous casting machine and method to produce the continuously traveling synthetic resin strip incorporating, for example, printing in the form of patterns of various kinds, marbleized effects and practically anything of which the printing art is capable, with the strip surface retaining its characteristic hard and shiny surface appearance, weatherproofness and the like. The strip continuously leaves the machine at its usual high production rate, but decorated as indicated; subsequent surface printing is not involved.

The previously described belt spans of a continuous casting machine are formed usually by stainless steel belts formed into upper and lower endless loops preferably horizontal but sometimes inclined and stretched tautly between oppositely positioned rotating drums. To practice this invention, a strip of film is fed to at least one of the traveling belts, the film being layed on the belt side forming the casting space, preferably adjacent to the entrance end of the casting space belt spans, by being fed continuously from a supply roll of film. The film layed on the surface of the belt preferably has a width equal to that of the strip being continuously cast, the film being carried frictionally along by the belt so as to enter the casting space formed by the belts, at the position where the syrup is being fed.

The film being itself in strip form, can be continuously printed by any printing process applicable such as by offset, rotogravure and the like. The film can be printed on only one side, and if so, is preferably fed with its unprinted side layed on the belt. Unprinted film can be used, such as colored film, for example.

Prior to feeding the film to the belt, the surface of the belt can be thinly coated with the syrup being cast, the film being then layed on this thin coating. This prevents the film from directly contacing the belt and the coating polymerizes during passage through the casting machine. The coating forms an outermost surface having the finish characteristically provided by the polished belts.

The film should be compatible with the syrup being cast so that it can become, in effect, an integral part of the strip leaving the machine. The term "compatible" means in this specification that the film can be partially swollen or dissolved in monomer, for example methylmethacrylate, in the syrup. The film should have a composition which becomes partially swollen and/or dissolved on its surface in the syrup during the feeding and polymerization. For example, if the casting syrup or starting material is predominantly methyl methacrylate, in monomerpolymer form, the film can be of corresponding composition. The film should be very thin as compared to the thickness of the strip being cast and polymerized by the machine. The monomer content of the syrup during the polymerization of the syrup in the feeding and the first polymerization zone of the continuous casting machine, causes the printed film to swell with its surface on the syrup more or less dissolving in the monomer content of the syrup and during polymerization of the syrup becoming an integral and substantially homogeneous part of the strip produced by the casting machine. If the machine's belt has been previously coated with the thin coating of the casting syrup, this coating, being on the outside of the film when between the machine's belts forming the casting space, polymerizes along with the syrup while acquiring the finish of the belts themselves. Therefore, the finished product has the surface characteristics described before.

The film, whether fed to one or both of the two traveling belts, preferably with the belt first coated thinly with the casting syrup, can be of substantially infinite length, this length depending only on the size of the roll of feeding film that is practical. The continuous operating characteristics of the continuous casting machine are not appreciably interfered with. The film integrates with the polymerized strip and become an integral part of the same, as contrasted to a laminated construction; and if the thin coating of syrup was first applied to the belts, the surface of the finished strip is composed of polymerized syrup just as is the balance of the strip. In any event, the printed patterns or the like, such as printing simulating a marble appearance, is always protected by the unprinted portion of the film and its outside surface, a protection substantially enhanced if the coating of polymerized syrup is on the outside.

Considering the application of the film to either one of the belts, the film, which can be very thin, is gravitationally pulled by contact with the belt into the first polymerizing zone of the continuous casting machine, pulling along with it the syrup being fed. In this case, it is the film which pulls the syrup in and builds up the hydraulic pressure in the case of the patented Kato et al machine. The film is frictionally engaged throughout its width by the belt so that the film can be smoothly pulled along and into the entrance of the machine. The frictional interengaging surfaces between the belt and the film are very large in area. Furthermore, the hydraulic pressure of the syrup presses and holds the film against the belt surface. In the first polymerizing zone of the machine, the monomer of the casting syrup causes the film to soften under the elevated temperature conditions existing while at the same time the fed syrup is progressively polymerizing. As the syrup approaching or at the end of the first polymerization zone become solid, the softened or partially dissolved film and syrup have become integrated to form a homogeneous strip which enters the second polymerization zone of the continuous casting machine. If the thin coating of syrup has been applied, it also has substantially polymerized. The strip product going through the second polymerization zone, where the higher temperatures prevail, has become a homogeneous strip throughout its thickness. The strip leaving the machine is as resistant to external influences as is the strip produced by the continuous casting machine but in an undecorated condition.

Although there has been a prior proposal to feed film into a continuous casting machine, it was believed to be necessary to use a film that does not soften or change in physical characteristics during passage through the polymerizing zones, or in other words, an imcompatible film. The result was excessive wrinkling of the film causing the product to be of no commercial value.

DESCRIPTION OF THE DRAWINGS

A specific example of the present invention is illustrated somewhat schematically by the accompanying drawings, in which.

DETAILED DESCRIPTION OF THE INVENTION

Figure 1:
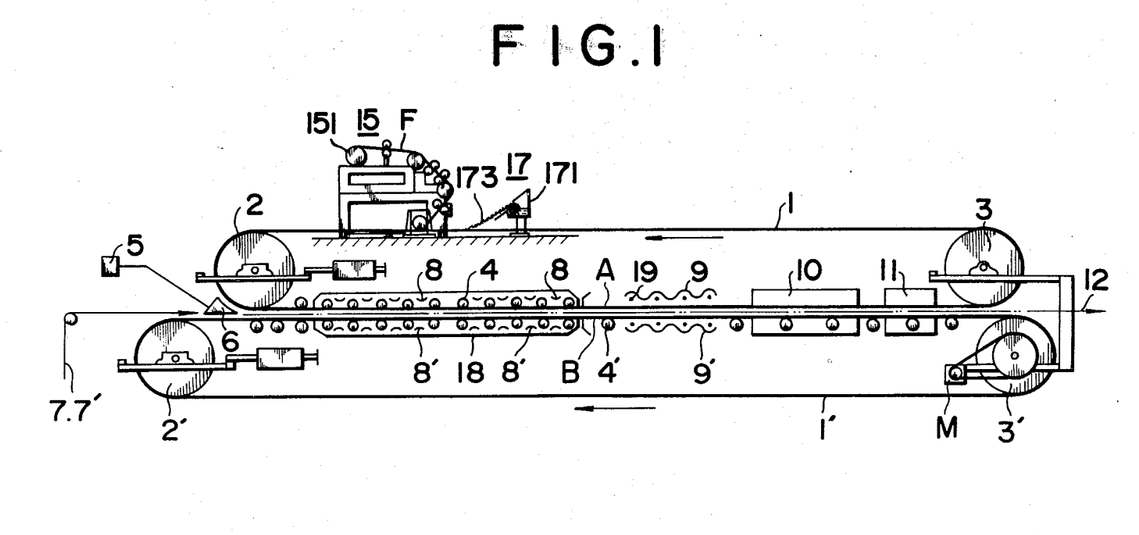
FIG. 1 is a side view of the continuous casting machine of the Kato et al patents, modified for the present invention.

Having reference to the above drawings, the continuous casting machine shown by FIG. 1 is of the horizontal type disclosed by the previously identified Kato et al patents, but the principles of the present invention are applicable to the older type of continuous casting machine of the inclined belt type.

In FIG. 1 the stainless steel belt loops 1 and 1' are each stretched under high tension by drums 2 and 2' and 3 and 3' to form interfacing horizontal belt spans A and B defining the casting and polymerizing space between them. The belt span portions on the left are held together by rollers 4 as required by the desired thickness of the finished strip. The syrup is metered by a suitable metering pump 5 to the feeder 6 which feeds the syrup to the casting space. The syrup is held against lateral flow from the space by the side sealing gaskets 7, 7', the hot water sprays of the first polymerization zone 18 being indicated at 8, 8'.

The second polymerization zone is formed by the radiant heaters 9, 9', this being followed by a first cooling zone 10 and a second cooling zone 11, the synthetic resin strip produced exiting from the machine as indicated by the arrow 12. A motor M drives the drum 3' and, although not indicated, preferably the drum 3, so that the two spans A and B travel forwardly at the same speed and in the same direction as indicated by the arrow 12.

In FIG. 1 a film feeder is shown at 15, preceded by a syrup-coating unit shown at 17. A casing confines the water from the water sprays 8 while 19 indicates the radiant heater's heating elements of the second polymerization heater 9, 9'.

Excepting for the film feeder 15 and the syrup coater 17, FIG. 1 shows what is essentially the highly successful horizontal continuous casting machine of the Kato et al U.S. Pat. Nos. 3,872,197 and 3,988,098, and reference may be made to those patents if further description is desired.

Figure 4:
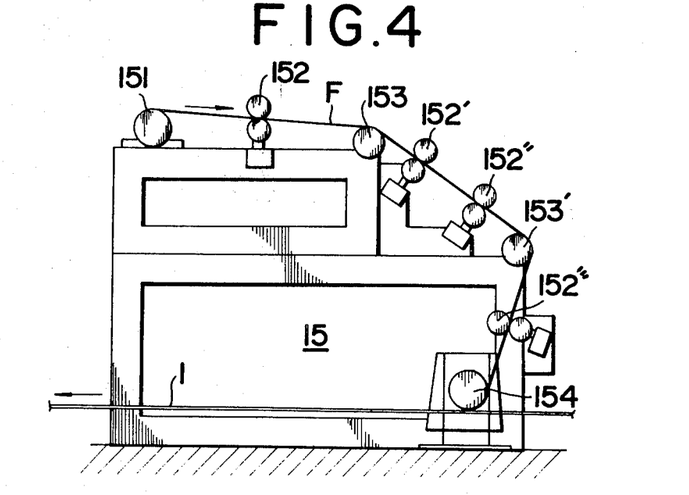
FIG. 4 is a side view of a feeder used to feed the film to the upper belt span.

The film feeder shown by FIG. 4 comprises the rotatively mounted drum 151 of coiled film and pinch rollers 152, 152', 152" and 152''', which together with guide rollers 152 and 153', feed the film smoothly and without tearing to a press roller 154 which presses the film onto the upper span of the belt loop 1 at a position adjacent to the end of the belt which is close to the feeder 6 and the entrance of the casting space.

Figure 2:
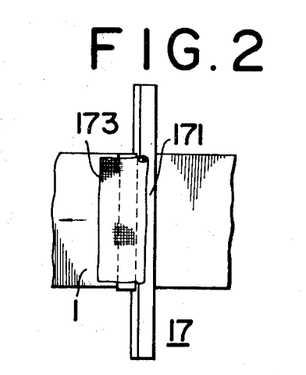
FIG. 2 is a cross section taken on the line II—II in FIG. 3, showing details of the equipment used to thinly coat the upper belt of the machine, with the syrup.
Figure 3:
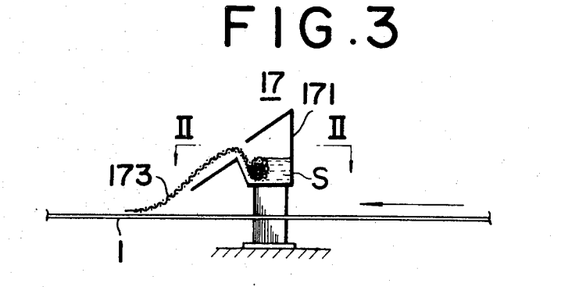
FIG. 3 is a side view of FIG. 2.

FIGS. 2 and 3 show the belt coating device as comprising a container 171 spaced above the upper span of the belt 1 and provided with a wick in the form of a width of gauze 173 which extends from the syrup S in the container 171 backwardly as in the belt traveling direction, with an end resting lightly on the belt surface which is that surface which after inversion of the belt around the drum 2, forms the top inside of the casting space. As shown by FIG. 2, the gauze 173 may extend for the full width of the portion of the belt 1 used to define the casting space.

Figure 5:
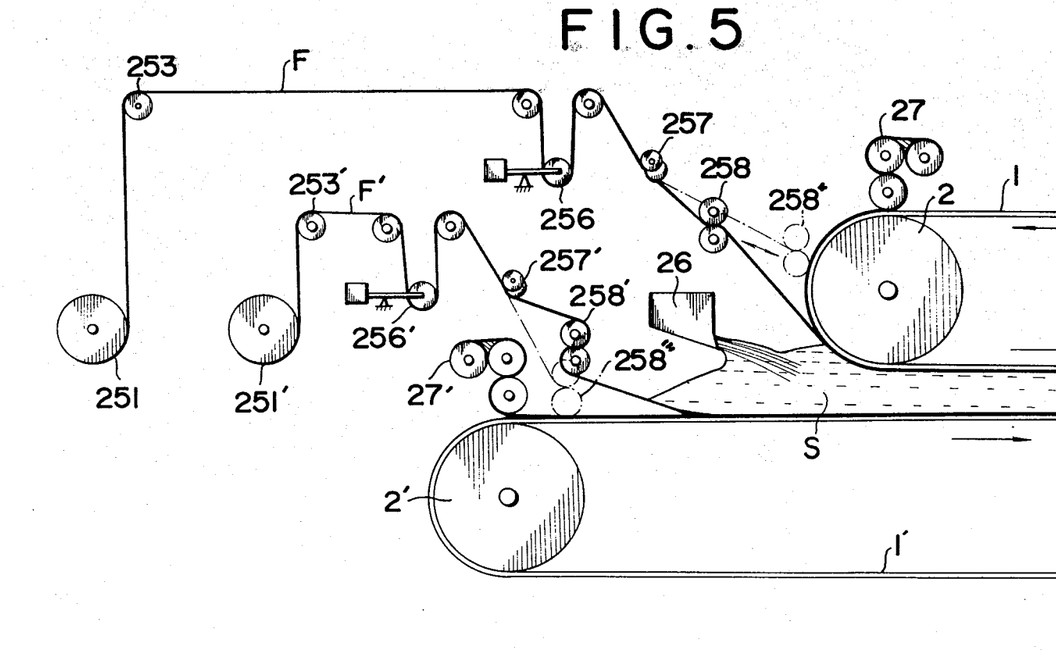
FIG. 5, in a side view, schematically shows the syrup-coating of both the lower and upper belts of the casting machine, and the feeding of films to both of the belts of the machine.

FIG. 5 shows another film feeding arrangement. The monomer or monomer-polymer mixture is coated on the surfaces of both the lower and upper belts 1 and 1' by coating devices 27 and 27'.

Films F and F' are unwound from coils 251 and 251' and are continuously fed, being allowed to stick to the monomer or monomer-polymer mixture coated on the surfaces of both the upper and lower belts 1 and 1', through guide rollers 253 and 253', tension regulators 256 and 256', expander rollers 257 and 257' and feed rollers 258 and 258'. 258" and 258'" show the state of transfer of feed rollers 258 and 258', respectively.

The monomer or monomer-polymer mixture for acrylic synthetic resin syrup is poured into the space surrounded by the surfaces of the upper and lower belts 1 and 1' at least one of which has the film F or F' allowed to stick thereon, by gaskets 7 and 7', the syrup being from feeding means 6 through gear pump 5.

The fed monomer or monomer-polymer mixture is transported together with films F and F' in accordance with the running of belts 1 and 1', during which the monomer or monomer-polymer mixture partially swells and dissolves the films F and F'. In the first polymerization zone the monomer or monomer-polymer mixture is heated by spraying hot water of 60°–95° C. on the back surface of the upper and lower endless belts 1 and 1' by the spray device 8 and 8'. By this heating the monomer or monomer-polymer mixture for the acrylic synthetic resin is polymerized and hardened into a polymerized and hardened product while becoming integral with the partially swollen and dissolved film F and F'. In the second polymerization zone 9 and 9' said product is heat treated to 115°–150° C. which is the temperature of endless belts 1 and 1', by the far infrared radiant heaters 19. Subsequent to the second polymerization zone 9 and 9', the polymerization hardened product between the upper and lower endless belts 1 and 1' is cooled to lower than 105° C., preferably 100°–80° C., by passing through the first cooling zone 10 and the second cooling zone 11 and thereafter is taken out from another end of the opposite endless belts 1 and 1'.

Running speed of the endless belts 1 and 1' is suitably 0.5–4.0 m/min.

Thickness of thus obtained acrylic synthetic resin sheet which is integrated with the acrylic film is preferably 2–12 mm.

When producing an acrylic synthetic resin strip on which an acrylic film is integrally laminated, this invention is characterized in that the acrylic film is partially swollen and dissolved with monomer of an acrylic synthetic resin syrup, and is then heated together with the syrup and becomes integral with the polymerized and hardened acrylic synthetic resin strip.

Methyl methacrylate resin strip can be used to exemplify this invention, comprising copolymers of at least 90% by weight of methyl methacrylate, and other copolymerizable monoethylenically unsaturated compounds and/or small amount of polyfunctional compounds may also be used.

Suitable monoethylenically unsaturated compounds are methacrylic esters, acrylic esters, styrene, or the like. Suitable polyfunctional compounds are methacrylic esters such as glycol dimethacrylate, diallyl methacrylate, or the like, diallyl phthalate, diethylene glycol bisallyl carbonate and mixtures thereof.

Alkyl methacrylate films are preferred as the acrylic film and examples thereof are those which are produced by polymerizing methyl methacrylate, ethyl methacrylate, butyl methacrylate, propyl methacrylate, alone or by copolymerizable components such as other acrylates, vinyl acetate, vinyl chloride, styrene, acrylonitrile, methacrylonitrile, etc. Suitable film is sold under the trademarks "KORAD" and "SHINKOLITE FILM".

The acrylic films used by this invention can be colorless and transparent when improved weather resistance or surface gloss only is desired, and those which are printed with patterns or colors are used when the final sheets are to be used as various decorative sheets, partitions, etc.

Examples of the practice of this invention are given below as follows:

EXAMPLE 1

A methacrylate and acrylate copolymer film ("SHINKOLITE FILM", a trademark for product of Mitsubishi Rayon Co., Ltd.) of 50μ in thickness, which had compatibility with the syrup of methyl methacrylate, and on which patterns were printed, was unwound from feeders 251 and 251' and was continuously fed through previously described guide rolls, tension regulators, expander rolls and feed rolls, on the endless belts 1 and 1', while a methacrylate monomer-polymer mixture was fed from the syrup feeding device 6–26 at a speed completely synchronized with the speed of the endless belts, to obtain a continuous synthetic resin sheet of methyl methacrylate having the same patterns as those on the film. The resultant synthetic resin sheet had the unique gloss on its surface, showed no wrinkles of the film, had the patterns printed on the film without distortion and as they were, and had a good quality.

EXAMPLE 2

A methyl methacrylate monomer-polymer mixture (syrup) which contained about 30% by weight of methyl methacrylate polymer with the balance monomer and had a viscosity of about 10 poises at 25° C. was prepared by partially polymerizing methyl methacrylate monomer. In the resultant syrup were incorporated 650 ppm of azobisdimethylvaleronitrile as a polymerization catalyst and 30 ppm of dioctylsulfosuccinate (Aerosol OT) as a releasing agent. As shown in FIG. 1, the resultant mixture was fed between the surfaces of the endless belts 1 and 1' at a fixed flow rate using gear pump 5 to feeding means 6. The endless belts 1 and 1' were made of polished stainless steel having a thickness of 1.5 mm and a width of 1500 mm and were given tension between pulleys 3 and 3' by pulleys 2 and 2' of 1600 mm in diameter. Tension of the endless belts 1 and 1' was set at 10 kg/mm² by hydraulic pressure and they ran at a speed of 3 m/min.

Film F of a copolymer of 64% by weight of methyl methacrylate and 36% by weight of butyl acrylate, which was printed with marble patterns and which had a thickness of 50μ, was fed to the upper belt 1 from film feeding device 15.

Prior to the feeding of the film F, a methyl methacrylate syrup was thinly coated on the surface of the upper belt 1 by the coating device 17.

As mentioned above, the methyl methacrylate butyl acrylate copolymer film was then fed so as to be held between the running two endless belts 1 and 1' together with the methyl methacrylate syrup supplied from feeding means 6.

The distance between the upper and lower endless belts 1 and 1' was kept by roller groups 4 and 4' which were arranged at the interval of 400 mm, so that the obtained sheet-like methyl methacrylate polymer had a uniform thickness of 3 mm. Polyvinyl chloride hollow tubes which had an outer diameter of 13.0 mm and a wall thickness of 0.8 mm and contained dibutyl phthalate corresponding to 44% by weight of the polymer as a plasticizer, were used as gaskets 7 and 7'.

The methyl methacrylate syrup fed into the space surrounded on one side by the surface of film F of methyl methacrylate/butyl acrylate copolymer and which film ran sticking to the upper belt 1, along with the surface of the lower belt 1' and gaskets 7 and 7' moved to the first polymerization zone 18. This first polymerization zone 18 had a length of 66 m and was heated by spraying hot water of 84° C. in the form of a shower onto the back surface of the endless belts 1 and 1' by the spraying devices 8 and 8'. Said methyl methacrylate syrup was mostly polymerized and hardened by said heating to obtain a sheet-like polymerization product. The film F of methyl methacrylate/butyl acrylate copolymer was partially swollen and dissolved by and with the methyl methacrylate monomer in the methyl methacrylate syrup fed into the entrance end of the two endless belts 1 and 1', during the period before it reached the first polymerization zone 18, and was integrally joined with the sheet-like polymerization product formed by polymerization of the methyl methacrylate syrup, in the first polymerization zone 18.

The methyl methacrylate sheet-like polymerization product which became integral with the methyl methacrylate/butyl acrylate copolymer film in the first polymerization zone 18, moved to the second polymerization zone 9 with running of the two endless belts 1 and 1'. The second polymerization zone 9 had a length of 24 m and the endless belts 1 and 1' which contacted with said sheet-like polymerization product was heated to 140° C. by the far infrared heaters 19. The temperature at the exit of the second polymerization zone 9 was 127° C.

The sheet-like product which left the second polymerization zones 9 and 9' moved to the first cooling zone 10 with running of the endless belts 1 and 1'. The first cooling zone 10 had a length of 5.4 m and the sheet-like product was cooled to 103° C. at a cooling rate of 14.4° C./min by vertically blowing air to the back surface of endless belts 1 and 1' by a blower. The second cooling zone 11 had a length of 3 m and said sheetlike product was cooled to 80° C. by blowing and the strip then taken out from endless belts 1 and 1'.

The resulting methyl methacrylate sheet-like polymerization product which was integrated with the methyl methacrylate/butyl acrylate copolymer film had a thickness of 3±0.3 mm, had a marble pattern appearance of excellent gloss and had no wrinkles. Furthermore, there occurred no phenomenon of separation of the methyl methacrylate/butyl acrylate copolymer film and the methyl methacrylate sheet-like product.

In FIG. 5, the feed rollers 258 and 258' are shown in broken lines at 258" and 258''' to indicate that the positions of these feed rollers are adjustable as required to permit the angles with which the film initially engages the belt surfaces to be controlled. It is possible that in some instances air may be entrapped between the films and the belt surfaces and this trouble can be eliminated by suitably selecting the angle of incidence between each film and the belt to which it is fed.

Also, in FIG. 5, the syrup S, indicated in exaggerated thickness, is shown as running backwardly up on the lower film F' being fed to the belt 1'. A characteristic of the machine of the Kato et al patents is that the forward motion of the two belts, in this case carrying the films, pulls the syrup into the casting space defined by the two forwardly traveling belt spans, some of the syrup extending backwardly from the feeding point but in dynamic balance with the lower belt's motion, keeping the back flow at a constant position while preventing lateral flow of the syrup until the latter enters the casting space between the two belt spans where the side sealing gaskets become operative. These side seals are not shown in FIG. 5 but are indicated in FIG. 1 and are explained by the Kato et al patents.

In the case of printed films with the printed side facing the syrup during casting, it has heretofore been thought necessary to use film that is incompatible with the syrup. It was thought that otherwise the printed patterns would become distorted.

Surprisingly, the use of film compatible with the syrup and with the printing on the side of the film in contact with the syrup, does not cause any loss of the definition of the printed patterns or material, although the surface of the film carrying the printing softens and partially dissolves in the syrup during the feeding and the first polymerization step in the continuous casting machine. The undistorted printing pattern or the like becomes integrally buried slightly beneath the surface of the finished product, the film and synthetic resin sheet becoming an integral piece throughout the thickness of the product. There are no laminations which might subsequently separate.

When a belt is first thinly coated with the syrup, the syrup softens the unprinted side of the film and likewise becomes integrated as part of the final product. In addition, by the use of film compatible with the syrup a continuous casting machine produces a product, whether printed or colored or not, inherently having an improved surface finish that is harder, more resistant to surface marking and generally of better quality than is usual.

The belts of a continuous casting machine are, of course, used in the form of elongated loops, each belt being endless and for its manufacture requiring that the ends of the metal strip used be welded together in each instance. The bottom loop is normally made to extend beyond the upper loop at the entrance end of the machine, the mutually parallel belt spans forming the casting and the polymerization space being, of course, interspaced vertically as required to produce the strip thickness desired.

The welded joints of the belts form marks on the strip produced, commercial lengths of sheets being cut from the strip as described by the Kato U.S. Pat. Nos. 3,982,153, 4,009,628 and 4,044,639. Such cutting is not interfered with by the practice of the present invention because the strip film and possibly its overlay of polymerized material are all one integral piece so that the cutters required operate as usual. Delamination cannot occur because the strip produced by this invention is integral throughout its thickness. However, because the cutting is somewhat at random, the use of printed patterns should take this into consideration, but this problem is encountered in the case of wallpaper and other products printed continuously in strip form.

Because of films compatible with the syrup entering and going through the casting space of the casting machine are compatible, the resulting softening and partial dissolving of one in the other causes the components to blend together without any visible lines of demarcation between the parts. This is true whether or not the thin coating of syrup is applied to one or both of the belts prior to application of the film or films to the belts.

Possibly the total thickness of the finished strip or sheet product of this invention may range from 1 to 15 mm, the starting film thickness being in the area of only about 50 microns. The product is made of basically transparent materials, possibly colored, through which printing, if used, is clearly visible.

What is claimed is:

1. A method for continuously producing synthetic resin sheet material having a synthetic resin film integrally blended with the sheet material, said method comprising feeding a polymerizable synthetic resin syrup to the entrance of the casting space formed by the continuously traveling endless belts of a continuous casting machine, said belts having mutually parallel interspaced belt spans forming said space, and continuously feeding to the surface of at least one of said belts a preformed synthetic resin film that is carried by the belt into said entrance into contact with said syrup and travels through the space with the syrup, said film being compatible with said syrup so as to soften and at least partially dissolve in and blend with said syrup, said belts being heated so as to polymerize said syrup and produce said sheet material as a continuously traveling strip leaving said machine.

2. The method of claim 1 in which said syrup is acrylic resin.

3. The method of claim 1 in which said film is acrylic resin.

4. The method of claim 1 in which said syrup is a methyl methacrylate monomer-polymer syrup and said film is a methyl methacrylate polymer film.

5. The method of claim 1 in which said film is polyvinyl chloride.

6. The method of claim 1 in which said film is polycarbonate.

7. The method of claim 1 in which said film is colored or printed on its surface contacted by said syrup.

8. The method of claim 1 in which the surface of the belt is thinly coated with the syrup being cast prior to feeding the film to the belt and then the film is layed on the thin coating.

* * * * *

UNITED STATES PATENT AND TRADEMARK OFFICE
CERTIFICATE OF CORRECTION

PATENT NO. : 4,254,074

DATED : March 3, 1981

INVENTOR(S) : Yasuo Toyooka et al.

It is certified that error appears in the above—identified patent and that said Letters Patent is hereby corrected as shown below:

Column 9, line 8, delete "of".

Signed and Sealed this

Twenty-first Day of July 1981

[SEAL]

Attest:

Attesting Officer

GERALD J. MOSSINGHOFF

Commissioner of Patents and Trademarks

UNITED STATES PATENT AND TRADEMARK OFFICE
CERTIFICATE OF CORRECTION

PATENT NO. : 4,254,074
DATED : March 3, 1981
INVENTOR(S) : Yasuo Toyooka, et al

It is certified that error appears in the above—identified patent and that said Letters Patent is hereby corrected as shown below:

Col. 3, line 22, change "become" to --becomes--.

Col. 3, line 50, change "become" to --becomes--.

Col. 4, lines 50, 51, 55 and 56, all references to "15" and "17" in the drawings should be underscored.

Col. 4, line 64, change "152" to --153--.

Col. 5, line 38, insert a comma after "heating".

Col. 6, line 1, change "amount" to --amounts--.

Signed and Sealed this

First Day of September 1981

[SEAL]

*Attest:*

*Attesting Officer*

GERALD J. MOSSINGHOFF
*Commissioner of Patents and Trademarks*